United States Patent [19]

Curinier et al.

[11] 4,242,779
[45] Jan. 6, 1981

[54] APPARATUS FOR THE MANUFACTURE OF NON-WOVEN TEXTILE FABRICS

[75] Inventors: Jean Curinier, Le Cheylard; Charles Vandermarliere, Pont-de-Cherruy, both of France

[73] Assignee: Les Fils d'Auguste Chomarat & Cie, Paris, France

[21] Appl. No.: 898,577

[22] Filed: Apr. 21, 1978

[30] Foreign Application Priority Data

Apr. 24, 1977 [FR] France ................ 77 13991
Jul. 13, 1977 [FR] France ................ 77 22475

[51] Int. Cl.³ .................................... D04H 3/04
[52] U.S. Cl. ............................ 28/101; 156/439
[58] Field of Search ................. 28/101; 156/439

[56] References Cited

U.S. PATENT DOCUMENTS

| | | | |
|---|---|---|---|
| 3,422,511 | 1/1969 | Sequin | 28/101 X |
| 3,608,164 | 9/1971 | Bolles | 28/101 |
| 3,643,300 | 2/1972 | Sequin | 28/101 |
| 4,071,931 | 2/1978 | Niederhauser | 28/101 |

FOREIGN PATENT DOCUMENTS

| | | |
|---|---|---|
| 501934 | 2/1920 | France . |
| 539822 | 4/1922 | France . |
| 1367567 | 6/1964 | France . |
| 1524992 | 4/1968 | France . |
| 1537811 | 7/1968 | France . |
| 2067607 | 8/1971 | France . |
| 2118877 | 8/1972 | France . |

*Primary Examiner*—Robert Mackey
*Attorney, Agent, or Firm*—Arnold, White & Durkee

[57] ABSTRACT

An apparatus for forming a web of weft yarns, which run transversely relative to the length of the web, and which may be incorporated in a non-woven fabric, wherein a pair of laterally spaced substantially parallel helical yarn guide members are each rotated about their own axis and at least two yarn feed elements are rotated about an axis parallel to and between the two laterally spaced helical yarn guide members, the weft yarn being fed through at least two of the yarn feed elements whereby they are wrapped around the laterally spaced helical yarn guide supports. A yarn guide ramp is provided adjacent each helical yarn guide member on the upstream side of the member, with respect to the direction of rotation of the guide element, the yarn guide ramps guiding the yarns as they leave the feed elements so that they are engaged between successive turns of the helical yarn guide members.

3 Claims, 11 Drawing Figures

APPARATUS FOR THE MANUFACTURE OF NON-WOVEN TEXTILE FABRICS

BACKGROUND OF THE INVENTION

1. Field of the Invention

The present invention relates to an apparatus for the manufacture of non-woven textile fabrics.

2. Description of the Prior Art

Non-woven textile fabrics are well-known articles and essentially comprise longitudinal warp yarns and transverse weft yarns, it being possible for the weft yarns to be either perpendicular to the warp yarns or inclined to the latter, the cohesion of the whole being effected by glueing the yarns to one another at their points of intersection.

Numerous techniques are used for producing these articles.

Thus, French Pat. No. 501,934 describes the production of a textile fabric which is capable of being incorporated between two sheets of paper, the fabric being obtained by winding a series of yarns in a helix around the two selvedge yarns, which series of yarns are fed from bobbins assembled on endless chains or conveyors circulating continuously around the selvedge yarns. The selvedge yarns can optionally be taken from bobbins arranged outside the apparatus, and can pass inside the path of the bobbins and yarn-guides through hollow spindles.

Such a device makes it possible to obtain fabrics in which the yarns cross one another to form diamond shapes.

French Pat. No. 539,822 describes an apparatus for obtaining a network of warp and weft yarns which cross each other approximately at right-angles. According to this document, the weft web is obtained by wrapping a plurality of weft yarns around two laterally spaced, substantially parallel helical yarn guide members, the yarns being wrapped in successive turns of the helices of yarn guide members, which are rotated so that the weft yarns are advanced. The weft yarns are fed from bobbins assembled on a rotary unit, from which they unwind normally around the two helical yarn guide members, the wrapping being achieved by means of rotary arms which lay down their yarn between the turns of the turns of the helices. In order to increase their output, it is possible to use helical yarn guide members comprising a plurality of individual helices which are imbricated with one another, the number of these helices being equal to the number of bobbins to be unwound.

Preferably, each helix respectively comprises one or more rods, which advantageously have a round cross-section, the diameter of the rods being approximately equal to the distance which should exist between two weft yarns.

The weft web formed is combined with a warp web, it being possible for this warp web to be incorporated either inside the weft web or superimposed on the latter.

Such an apparatus is generally satisfactory; however, it exhibits the disadvantage of having a relatively limited production speed, because the bobbins which feed the weft yarns are arranged at the periphery of the rotary element which supports them and become further from the axis of rotation of this support as the width of the web formed increases. Furthermore, in accordance with the method of production described in this document, the weft yarn bobbins are relatively difficult to change.

Finally, as the helices rotate at the same speed as the rotary arms, the weft yarns cross one another in the middle of the web formed.

Numerous other documents described improvements in this technique which make it possible, in particular, to produce, according to this process, weft webs in which the yarns are rigorously parallel to one another.

Thus, French Pat. No. 1,542,992 and U.S. Pat. No. 3,422,511 describe a method according to which two weft yarns are dispensed around helical yarn guide members comprising two intertwined helices, the yarns being arranged in a parallel manner by dispensing the yarns with a displacement of a quarter of a pitch between the turns of the helices, for example, by using a rotary component having four hollow arms which are angularly displaced by 90°, the yarn being dispensed by two adjacent arms which are 90° apart, whereby the other two arms do not dispense any yarn and are only used for dynamic balancing of the unit.

Such a method has the disadvantage of only dispensing yarns over half the rotation of the dispensing component, which substantially reduces the output.

Furthermore, if the helices rotate at the same speed as the dispensing arms, parallel yarns are indeed obtained but, with this process, it is impossible to dispense more than two yarns per rotation of the dispensing element.

French Pat. No. 2,067,607 additionally and U.S. Pat. No. 3,643,300 describe a device which also makes it possible to produce non-woven textile fabrics from a rotating element for dispensing two weft yarns around two selvedge yarns and/or warp yarns, one of the two bobbins being fixed inside and the other being fixed outside the volume delimited by the rotation of the rotating element.

According to this document, the two weft yarns are also dispensed around rotary lateral elements in the form of a helix. When it is desired that the weft yarns should be parallel to one another, it is necessary to use helices which have a different structure from each other and also rotate at different speeds. Thus, on the one hand, one of the helices must be a single helix having a pitch which is double that of the weft web being obtained and rotating at a speed which is double the speed of rotation of the dispensing element and, on the other hand, the other helix must be a double helix which comprises two helices and rotates at the same speed as the dispensing element, these helices having a pitch which is four times that of the weft web and being mounted one inside the other.

Such a device is therefore complex and only makes it possible to dispense two weft yarns. Furthermore, the selvedges of the article formed are not symmetrical, which is disadvantageous when the fabric is used.

Admittedly, such a device exhibits the advantage that it avoids the necessity of moving the weft bobbins, but it has limited efficiency since, for each rotation of the rotating element, only two weft yarns can be dispensed. Furthermore, the helical yarn guide members, around which the weft yarns are arranged, are mounted at the ends of an arm which must be immobilised by means of stops, in order to prevent it from being caused to rotate. This immobilisation is generally achieved by means of a simple wedge placed below the helices. Such an assembly therefore creates numerous vibrations and makes it difficult to position the weft yarns precisely.

Finally, French Pat. Nos. 1,367,567, 1,537,811 and 2,118,877 also describe various techniques to produce nonwoven textile fabrics comprising transverse yarns.

SUMMARY OF THE INVENTION

In one form of the apparatus according to the invention, the helical yarn guide members each comprise a plurality of individual helices imbricated with one another, wherein the number of helices is equal to the number of weft yarns being fed, wherein the individual helices are rotated at a speed which is double that of the speed of rotation of the yarn feed elements, and wherein the point at which the yarns are guided into the interstices is displaced alternately from back to front, in the direction of advance of the web, whereby the weft yarns are strictly parallel to one another and identical selvedges are formed.

Various means can be used to move the laying-down point of half of the yarns, relative to that of the remainder of the yarns, in order to obtain wefts which are perfectly parallel to one another.

In one arrangement, feed arms are used, the ends of which are displaced one half at a time, these arms dispensing the yarns onto fixed yarn-guides which are used as a point of support for the yarns in order to present them correctly in the desired spaces between the turns of the helices, and each helical member being associated with two ramps which are spaced apart from one another and arranged tangentially to the said helix and at a distance from one another, the value of which distance is equal to the value of the pitch of a helix, minus the thickness of the material forming the helical guide member.

In another arrangement, the guide ramps comprise a single ramp member, the end adjacent the helical guide member of which is reciprocable over a distance which is equal to the pitch of the helix less the thickness of the material forming the helical yarn guide member so that half of the yarns are laid between two given turns of the helix and the remainder are laid between the adjacent pair of turns.

BRIEF DESCRIPTION OF THE DRAWINGS

In order that the invention will be better understood, the following description is given, merely by way of example, reference being made to the accompanying drawings, in which.

DETAILED DESCRIPTION OF PREFERRED EMBODIMENTS

Figure 11:
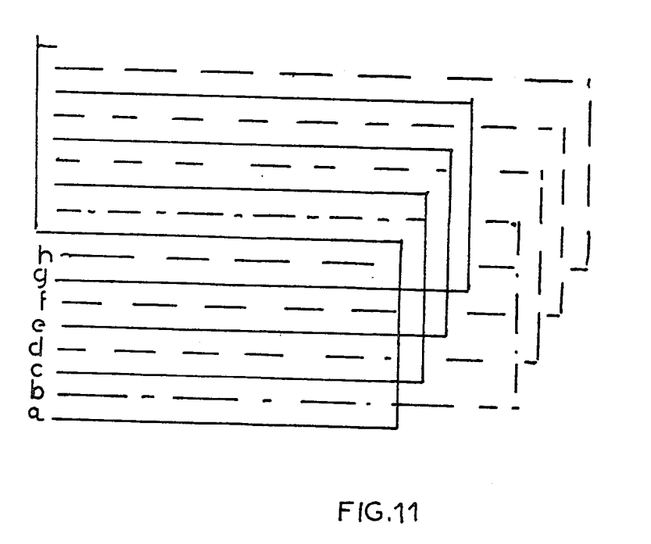
FIG. 11 illustrates an article obtained by feeding eight weft yarns to form a weft web according to the invention.

In the apparatus illustrated by FIGS. 1, 2, 3 and 4, two weft yarns are fed simultaneously. However, it is clear that this is not limiting and that four, eight and so on, weft yarns can be fed using the method and apparatus according to the invention. For example, in the embodiment illustrated in FIGS. 5 to 9, four weft yarns are fed, but this apparatus can also be used to dispense a higher number of weft yarns, for example eight, as illustrated in FIG. 11, the only modification relative to the apparatus described being the amplitude of the displacement of the second half of the yarns relative to the first half.

Figure 1:
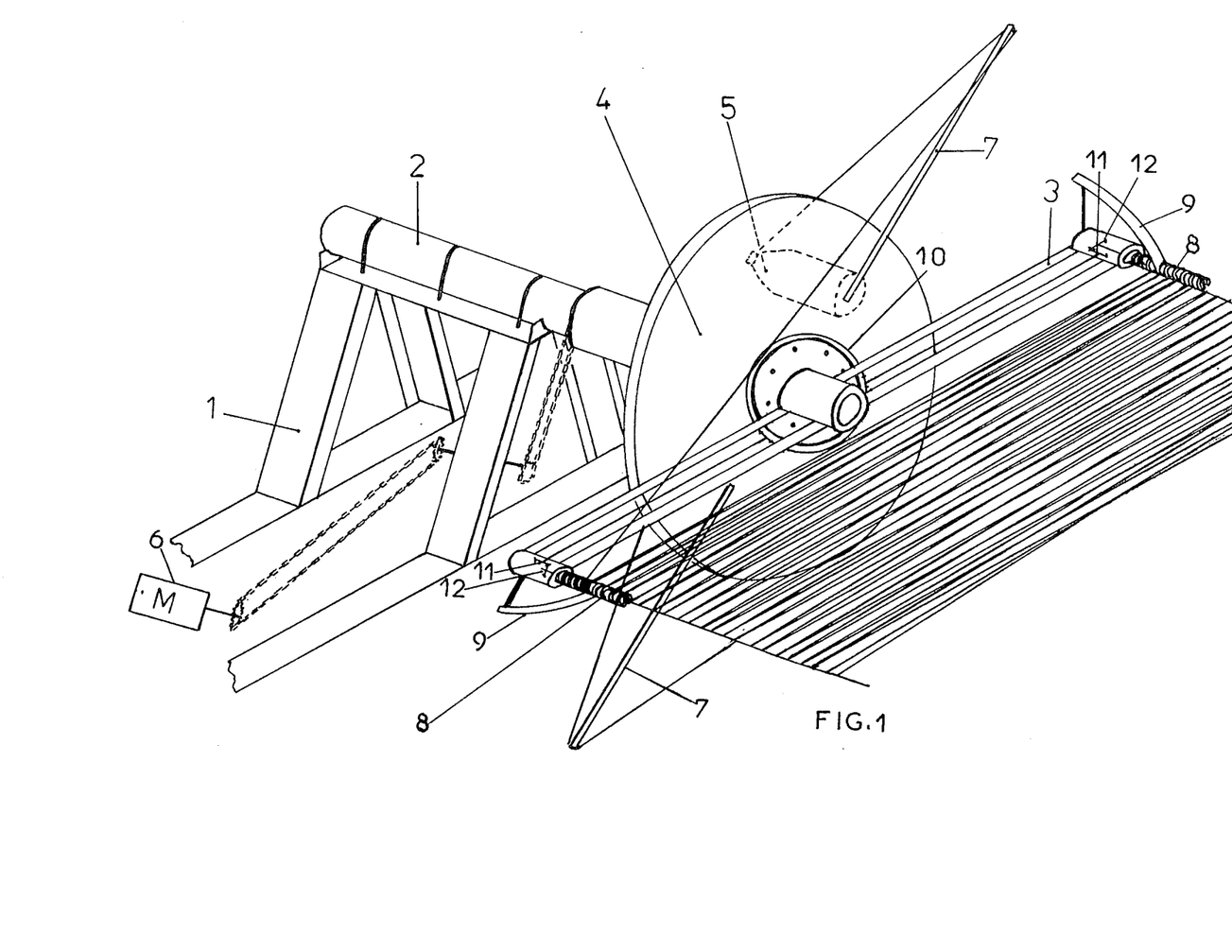
FIG. 1 is a schematic perspective view of one embodiment of apparatus according to the invention, which makes it possible to feed two weft yarns simultaneously, in such a way as to produce a weft web in which the yarns cross one another in the central part of the web formed.

The apparatus illustrated in FIGS. 1, 2, 3 and 4, comprises fixed frame 1 on which is mounted a hollow central shaft 2, one of the ends of which has cantilevered thereon a transverse support 3, the assembly 2, 3 thus having the shape of a T. A plate 4, on which are carried weft yarn bobbins 5, is mounted on the hollow shaft 2, so as to rotate freely, and is slightly set back relative to the transverse support 3. Plate 4 is rotated by a motor 6. The weft yarn bobbins 5, only one of which is shown in FIG. 1, are mounted uniformly on the plate 4 and are arranged as closely as possible to the axis of rotation of the said plate.

Mounted on the plate 4 are two hollow weft yarn feed arms 7. These feed the weft yarns leaving bobbins 5, so that they are wrapped around a pair of laterally spaced helical yarn guide members 8 which are arranged at each end of the transverse support 3. Rotation of members 8 advances the web formed and means (not shown) are provided for superimposing on this web one or more webs of warp yarns.

The weft yarns 5 leaving arms 7 are laid down onto the yarn guide members 8 by means of guide-ramps 9 which are arranged adjacent to the members 8.

The length and the shape of the arms 7 are such that, when they rotate, the yarn which has just been laid down onto one of the yarn guide members 8 rests on the guide-ramp 9 which is associated with the respective member 8. In this manner, the yarn is guided perfectly and introduced precisely inside the guide members.

Depending on the number of the bobbins for feeding weft yarns, the helical yarn guide members 8 will either comprise as many helices as there are weft yarns, the said helices then rotating at the same speed as the feed arms, or they will be formed by single helices, these helices then rotating at the speed of the feed arms multiplied by the number of yarns dispensed. In other words, in the latter case, if, for example, four weft yarns are fed, the single helices must rotate four times faster than the feeding arms.

Figure 2:
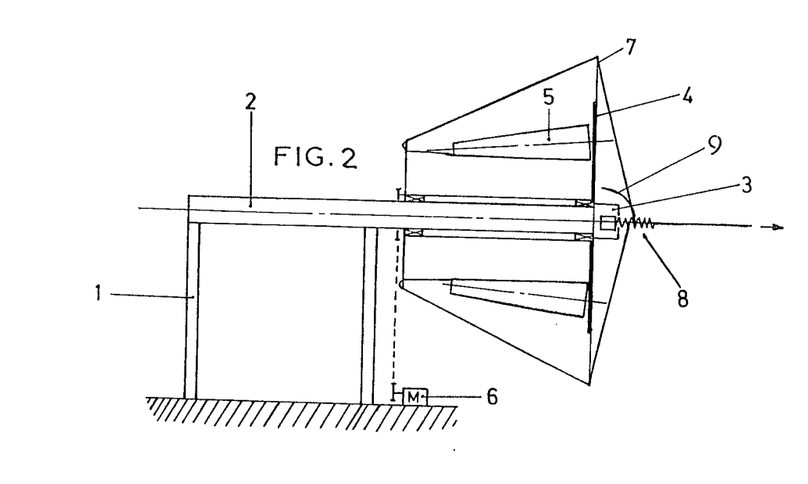
FIGS. 2, 3 and 4 are, respectively, a schematic side view, end view and a plan view of the apparatus of FIG. 1.
Figure 3:
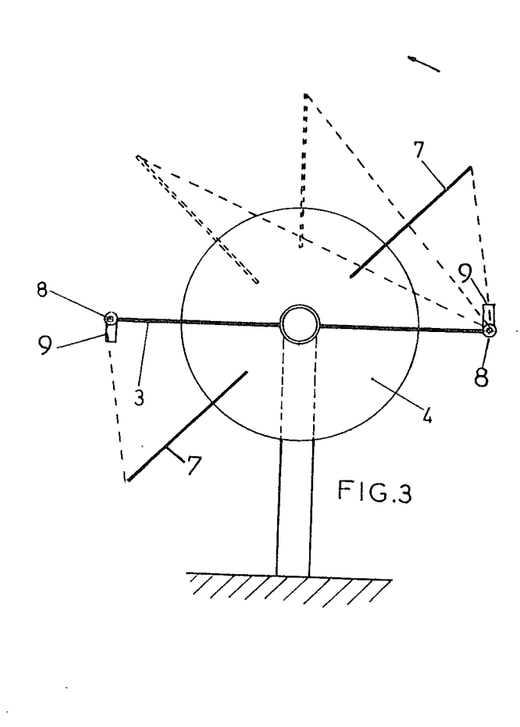
Figure 4:
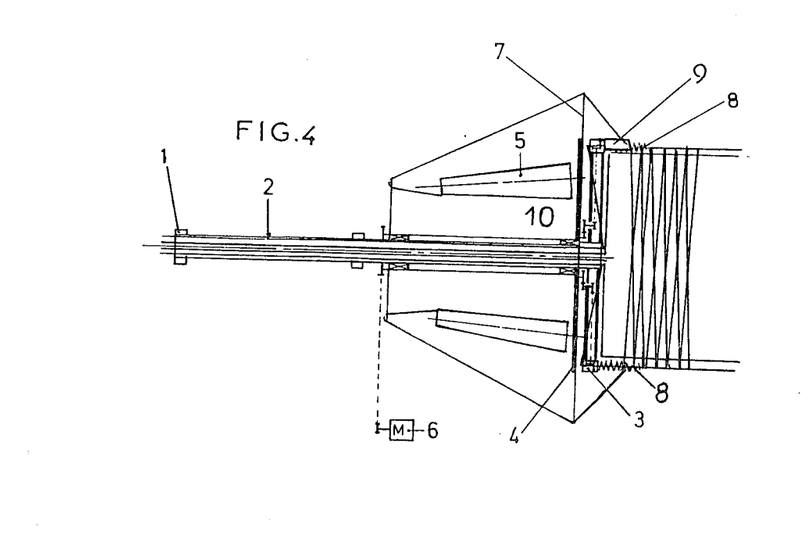

In the apparatus illustrated in FIGS. 2, 3 and 4, the members 8 can be caused to rotate in a simple manner, directly by means of the motor 6, by providing, on the plate 4, a gear-wheel 10 which is firmly fixed, during rotation, to the said plate 4, which gear-wheel drives the members 8 by means of bevel gears 11 and 12 and/or sprockets which are mounted on the transverse element 3.

When two identical helices are used as the yarn guide members, which helices either comprise an identical number of helices imbricated with one another, the helices then rotate at the same speed as the feed arms, or comprise single helices rotating at the speed of the feed multiplied by the number of yarns dispensed, it is obvious that the weft yarns will cross one another in the middle of the web formed, and that the textile fabric obtained will comprise yarns arranged diagonally relative to the warp yarns.

Furthermore, in order to secure the ends of the weft yarns, it is advantageous to bring the selvedge yarns inside the helices in a known manner.

Finally, as shown in the various drawings, it is advantageous to arrange weft yarn bobbins 5 behind the plate 4, which provides easy access when it is desired to change the bobbins.

This device according to the invention is simple, rapid and makes it possible to obtain, economically and at high speed, webs of weft yarns which are incorporated into the production of non-woven textile fabrics. Clearly, this is not limiting and such webs of weft yarns could be used for any other application such as, for example, strengthening paper, film and the like.

Figure 8:
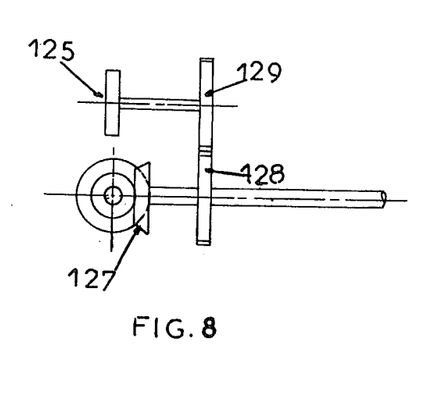
Figure 9:
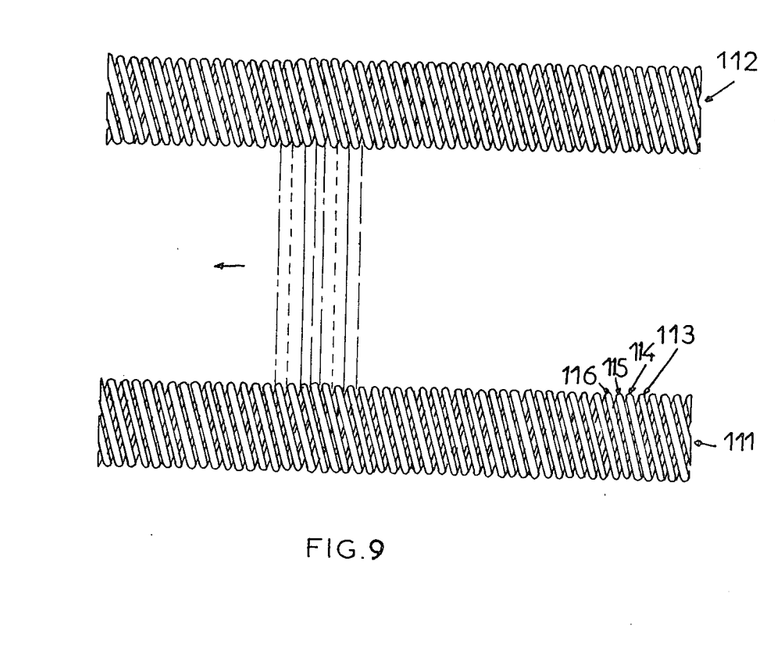
FIG. 9 illustrates a view of a part of one type of web formed between the two helical yarn guide members.
Figure 10:
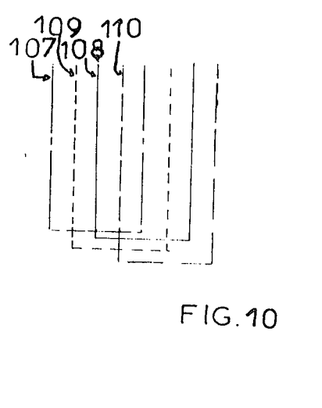
FIG. 10 illustrates the manner in which four yarns are arranged relative to one another at the selvedges.

FIGS. 5, 6, 7, 8 and 9 illustrate the production of an article which is obtained by feeding four weft yarns, and which, after formation, has the structure shown in FIG. 10.

Figure 5:
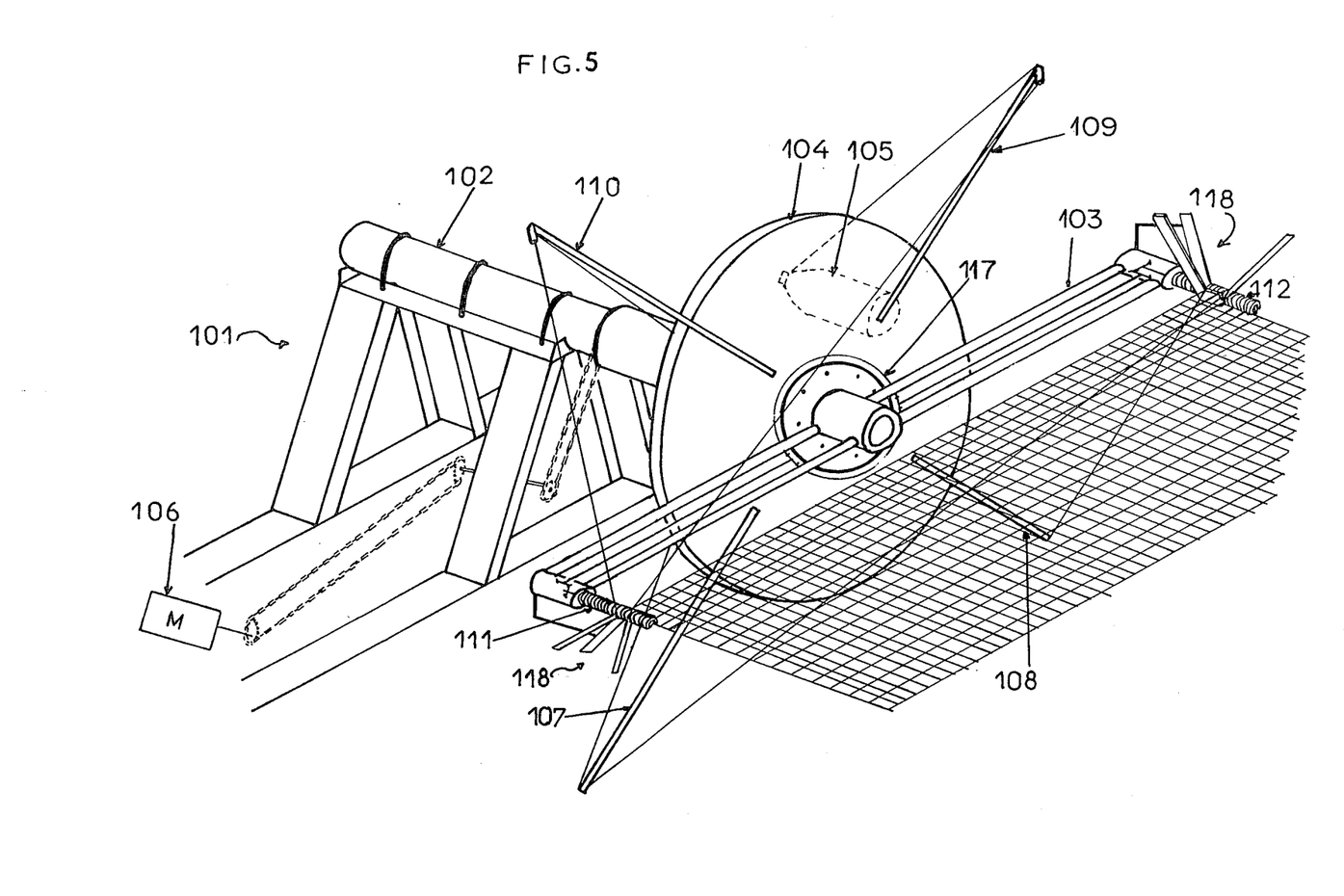
FIG. 5 is a schematic perspective view of a second embodiment of apparatus according to the invention.

As can be seen in FIG. 5, the apparatus comprises a fixed frame 101 which has mounted thereon a hollow central spindle 102, one of the ends of which is firmly fixed to a cantilevered transverse support 103, the thus formed assembly essentially having the shape of a T. A plate 104 supports the weft yarn bobbins 105, is mounted on the hollow spindle 102 so as to rotate freely, and is slightly set back relative to the transverse support 103. This plate is rotated by a motor 106 outside the frame. The weft yarn bobbins 105 (only one of which is shown in FIG. 5) are mounted uniformly on the plate 104 and are arranged as closely as possible to the axis of rotation of the said plate.

The apparatus also comprises feed arms 107, 108, 109 and 110 for wrapping the four weft yarns around lateral spaced helical yarn guide members 111 and 112 which are arranged at each end of the transverse support 103. In the following description, for simplicity, the weft yarns will be denoted by the reference numerals of the arms 107, 108, 109 and 110 which feed them.

The apparatus also comprises means for advancing the web formed and for superimposing this web with one or more webs or warp yarns, which elements are well-known and which it is therefore unnecessary to described and show.

According to this embodiment, the feed arms 107, 108, 109 and 110 are wrap four weft yarns around members 111 and 112 per revolution of the plate 4.

Furthermore, the members 111 and 112, which make it possible to position, secure and advance the web of weft yarns which is formed, comprise helices of the type of those described in French Pat. No. 539,822. These helices 111 and 112 are identical and consist of four helices 113, 114, 115, and 116 (see FIG. 6) which are imbricated with one another. These helices are advantageously produced from a metal rod having a round cross-section, the diameter of which approximately corresponds to the distance which it is desired to have between two yarns when the web is formed, the space between two successive helices being small and serving only as a passage for the yarn between them.

The helices 111 and 112 are caused to rotate at a speed which is double the speed of rotation of the plate 114 carrying the dispensing arms 107, 108, 109 and 110. This rotation is caused in a simple manner, directly by means of a motor 106, by providing a gear-wheel 117 which is firmly fixed to the plate 104 for rotation therewith, which gear-wheel drives the lateral elements 111 and 112 by means of bevel gears and/or sprockets which are mounted on the transverse element 103.

Consequently, when the arms rotate, the yarns rest on the respective ramp 118 which is associated with the yarns, and are introduced, on the one hand, into the space between the first and second helix for the yarn 107, and on the other hand, into the space between the third and fourth helix for the yarn 108, these two yarns being dispensed in the same vertical plane, and so that, for the last two yarns, for example, the yarns 109 and 110, the laying-down is displaced towards the front, in the direction of advance of the web formed, by a distance which is less than the pitch of the helix in question, with the result that, since these two yarns are arranged in the same vertical plane, the third yarn 109 is laid down between the second and third helix, and that the fourth yarn 110 is laid down between the fourth helix and the following turn of the first helix.

Figure 6:
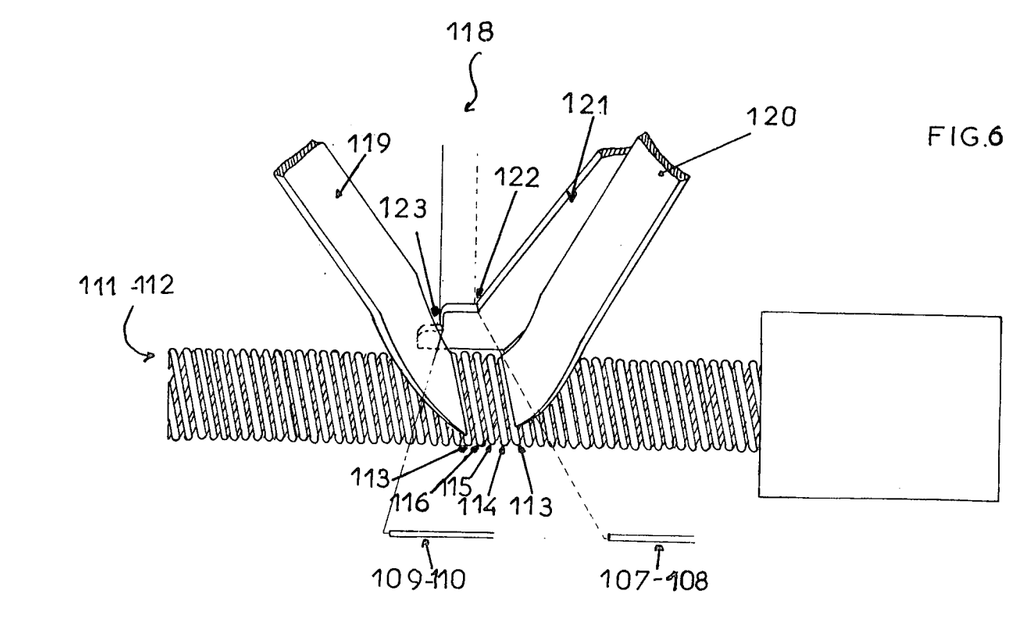
FIG. 6 is an enlarged side view showing one form of guide element which makes it possible to lay down the yarns at various levels in the helical yarn guide members.

FIG. 6 illustrates one embodiment of the guide ramps 118. In this Figure, the means which make it possible to cause the rotation of the helices have not been shown and, as regards the feed arms, only the position of the ends of these arms has been shown. According to this embodiment, the yarns are laid down between the helices forming the helical yarn guide members by means of fixed guides 119 and 120 which are inclined in the opposite direction, the ends of which are arranged near the helices, substantially tangentially to the surface of the latter, and which are spaced apart from one another by a distance which is substantially equal to the pitch of the helix in question. Furthermore, a ramp 121, which has positioning slots 122 and 123, also facilitates the guiding of the yarns. In the present case, the yarns are laid down either onto the guide 120, for the first two yarns, or onto the guide 119, for the last two, by using arms 107, 108, 109 and 110, the outlet ends of which are displaced relative to one another, the ends of the arms 107 and 108 being at a level which is such that the yarns are laid down in the same vertical plane onto the guide 120, and the ends of the arms 109 and 110 being slightly longer, so that the yarns are laid down onto the guide 119.

Consequently, when the arms rotate, the yarns rest on the respective ramps which are associated with the yarns, and are introduced, on the one hand, into the space between the first and the second helix, for the yarn 107, and into the space between the third and fourth helix, for the yarn 108, these two yarns being dispensed in the same vertical plane, and, on the other hand, into the space enclosed between the second and the third helix, for the yarn 109, and between the fourth helix and the following turn of the first helix, for the yarn 110, these two yarns also being laid down in the same vertical plane, but this plane being displaced, towards the front relative to the preceding laying-down plane.

Figure 7:
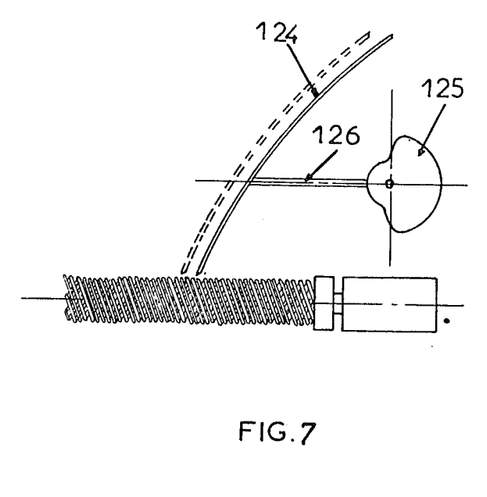
FIGS. 7 and 8 are, respectively, an enlarged side view and end view of a second form of such guide element.

FIGS. 7 and 8 illustrate another embodiment according to the invention, which makes it possible to feed the weft yarns 107 and 108, and 109 and 110, respectively, between the various turns of the helices. In this embodiment, when the arms 107, 108, 109 and 110 rotate, the ends of the arms are situated at the same level in the present case, the yarns are laid down onto a guide-ramp 124, one end of which is near the surface of the helices, substantially tangentially to this surface, the ramp 124 being joined, by means of a push rod 126, to a cam 125, the profile of which is such that, when it rotates, the ramp 124 is reciprocated parallel to the axis of the helix, with the result that, as previously, the third and fourth yarns are laid down at a position which is different from that of the first and second yarns, in the same manner as in the preceding embodiment.

As is shown schematically in FIG. 8, the cam 125, which causes the alternating movement of the ramp 124, is advantageously controlled by means of bevel gears and pinions 127, 128 and 129 which derive their motion directly from the means for causing the helices to rotate. In this manner, the synchronization between the various motions is facilitated.

As is shown in FIGS. 9 and 10, the abovementioned devices make it possible, according to the invention, to produce weft webs in which the weft yarns are rigorously parallel to one another. Furthermore, the selvedges of the webs are strictly identical and have the configuration shown in FIG. 10.

FIG. 11 illustrates a web which is obtained by dispensing eight yarns using the method and apparatus according to the invention, this web being obtained, as previously, by displacing the laying down point of half of the yarns (e, f, g and h) relative to the laying-down point of the remainder of the yarns (a, b, c and d).

As previously, the webs thus formed can advantageously be superposed with one or more webs of warp yarns, the whole being bonded together by glueing in a known manner. In this case, the yarns are rigorously perpendicular to one another. Such a web can be used either as it is or, on the other hand, it can be used as elements for strengthening a paper, a plastic and the like.

We claim:

1. In an apparatus for the manufacture of a web of weft yarns which run transversely relative to the length of the web and which can be incorporated into a composite non-woven fabric, where said apparatus comprises, in combination:
   (a) a pair of laterally spaced helical yarn guide members rotatable about their own axes,
   (b) at least four yarn feed elements rotatable together about an axis which is parallel to and between the axes of the helical yarn guide members,
   (c) at least four bobbin supports,
   (d) means for feeding a yarn from a bobbin carried by each of said supports, whereby each yarn may be wrapped around said helical yarn guide members, and
   (e) a yarn guide yarn ramp placed adjacent each said helical yarn guide member, said yarn guide ramps being disposed to guide yarn into the space between adjacent turns of the respective helical yarn guide members,
   the IMPROVEMENT comprising:
   (f) the laterally spaced helical yarn guide members being substantially identical hollow rotary members, each helical yarn guide member comprising a plurality of individual helices imbricated with one another, wherein the number of helices is equal to the number of weft yarns being fed, and the individual helices are rotated at a speed which is double that of the speed of rotation of the yarn feed elements, and
   (g) each yarn guide ramp including two fixed guides, one upstream and one downstream of the direction of advance of the web, said fixed guides being disposed adjacent each helical yarn guide member, the ends of said fixed guides adjacent the helical yarn guide member being tangential thereto and at a distance from one another equal to the pitch of the helical yarn guide member minus the thickness of the material forming the helical yarn guide member itself, said fixed guides being inclined in opposite directions, the upstream guide being inclined away from the direction of advance of the web and the downstream fixed guide being inclined toward the direction of advance of the web,
   (h) a first half of the yarn feed elements, said first half including feed elements adjacent one to the other and having their outlet ends positioned upstream of the upstream fixed guides, and a second half of the yarn feed elements, said second half including feed elements adjacent one to the other and having their outlet ends positioned downstream of the downstream fixed guides, so that the yarns from the first half of the yarn feed elements are laid down in a common vertical plane and guided into spaces between turns of the helices by the upstream fixed guide and the yarns from the second half of the yarn feed elements are laid down in a common vertical plane and guided into spaces between turns of the helices by the downstream fixed guide, whereby the weft yarns are strictly parallel to one another and identical selvedges are formed.

2. Apparatus as claimed in claim 1, and further comprising a fixed stand, a hollow shaft mounted on said fixed stand, a cantilevered support member mounted on the free end of said hollow shaft to form a T-shaped member therewith, a rotatable shaft mounted for rotation about said axis which is parallel to and between the axes of the helical yarn guide members, a plate mounted for rotation on said rotatable shaft, wherein said helical yarn guide members are rotatable on the free ends of the said cantilevered support member and wherein said yarn feed elements include hollow radially extending arms mounted on said rotatable plate.

3. Apparatus according to claim 1 wherein each yarn guide ramp further includes a positioning ramp interposed between the yarn being wrapped around the helical yarn guide members and the fixed guides, said positioning ramp having upstream and downstream positioning slots, said upstream positioning slot being located so that the yarns from the first half of the yarn feed elements first come into the upstream positioning slot and are then guided onto the upstream fixed guide by said upstream positioning slot, and said downstream positioning slot being located so that the yarns from the second half of the yarn feed elements first come into the downstream positioning slot and are then guided onto the downstream fixed guide by said downstream positioning slot.

* * * * *

UNITED STATES PATENT AND TRADEMARK OFFICE
CERTIFICATE OF CORRECTION

PATENT NO. : 4,242,779

DATED : Jan. 6, 1981

INVENTOR(S) : Jean Curinier and Charles Vandermarliere

It is certified that error appears in the above-identified patent and that said Letters Patent are hereby corrected as shown below:

Column 2, line 6, "described" should read --describe--;

line 10, "1,542,992" should read --1,524,992--.

Column 5, line 54, "described" should read --describe--;

line 56, delete the word "are".

Signed and Sealed this

Twenty-sixth Day of May 1981

[SEAL]

Attest:

RENE D. TEGTMEYER

Attesting Officer            Acting Commissioner of Patents and Trademarks